United States Patent [19]
Doornenbal et al.

[11] Patent Number: 5,293,409
[45] Date of Patent: Mar. 8, 1994

[54] ELASTIC BUFFER

[75] Inventors: Anthony Doornenbal, Breukelen; Paul G. Snaphaan, Amsterdam, both of Netherlands

[73] Assignee: U.S. Philips Corporation, New York, N.Y.

[21] Appl. No.: 789,224

[22] Filed: Nov. 7, 1991

[30] Foreign Application Priority Data

Nov. 8, 1990 [NL] Netherlands ............... 9002426

[51] Int. Cl.$^5$ .................. H04L 7/00; H04L 25/36
[52] U.S. Cl. ........................ 375/106; 375/118; 365/220; 365/230.03
[58] Field of Search .............. 375/118, 114, 106; 370/102; 365/230.01, 230.03, 233

[56] References Cited

U.S. PATENT DOCUMENTS

| | | | |
|---|---|---|---|
| 3,569,632 | 3/1971 | Beresin | 370/105.4 |
| 3,867,579 | 2/1975 | Colton et al. | 179/15 |
| 4,434,498 | 2/1984 | Mathieu | 375/114 |
| 4,755,971 | 7/1988 | Jasmer et al. | 370/102 X |

FOREIGN PATENT DOCUMENTS 2583238  6/1985  France .................. H04B 14/04

Primary Examiner—Curtis Kuntz
Assistant Examiner—Tesfaldet Bocure
Attorney, Agent, or Firm—Anne E. Barschall

[57] ABSTRACT

Communication of digital information between digital systems (2, 3) comprising clock generators (8, 9) is effected via storage in memory locations a1 to a8 and b1 to b8 of a cyclic buffer 4, in which, in succession, the information is written and read on a time base determined by the various clock generators (8, 9). Pointers stored in pointers (12, 13) determine the memory locations to be read out or written. If the pointers have become equal as a result of phase deviations of the clock generators (8, 9), this is detected by an address distance monitoring means (14) and made unequal and set to a maximum difference value relative to each other. The difference value amounts to half the number of memory locations n in a row of the buffer 4. For full duplex transmission the buffer 4 preferably comprises a double row of memory locations a1-an and b1-bn respectively.

6 Claims, 1 Drawing Sheet

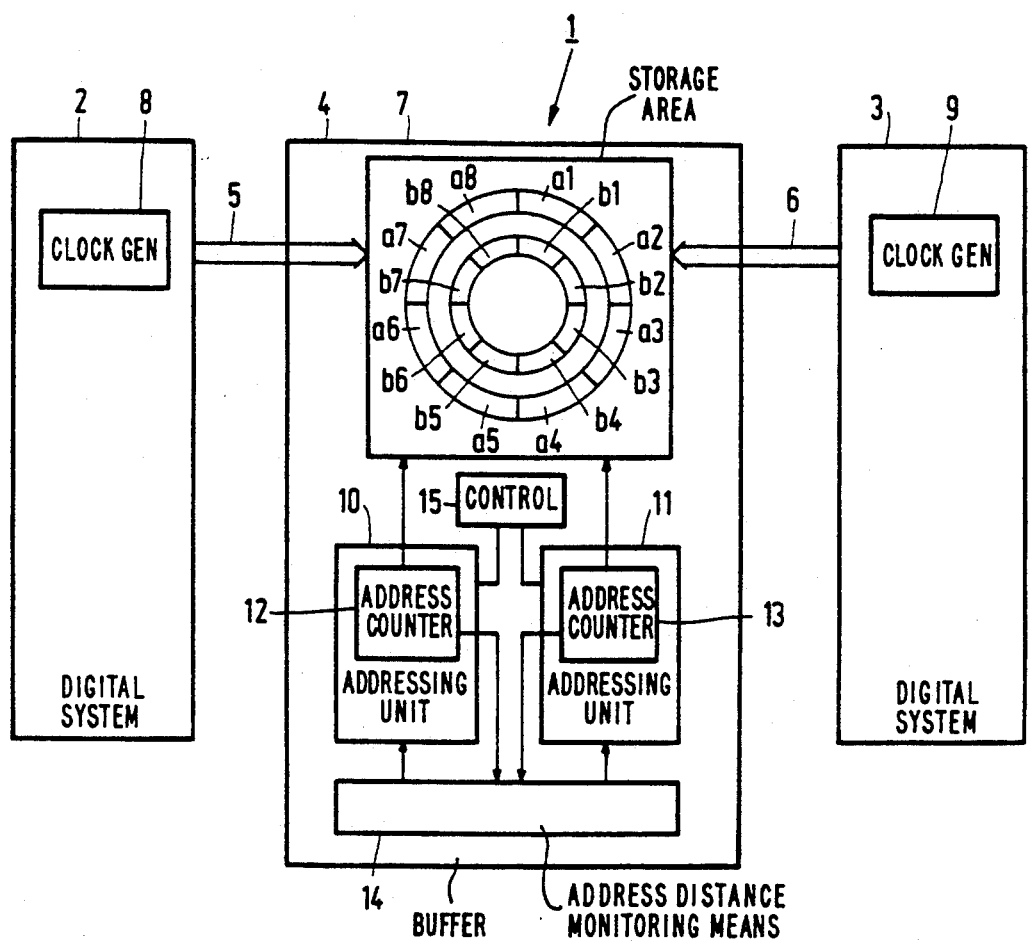

ELASTIC BUFFER

BACKGROUND OF THE INVENTION

1. Field of the Invention

The invention relates to a buffer for temporary storage of digital information in memory locations having n cyclically successive addresses, which information is transmitted between two digital systems coupled to each other through the buffer, which systems each comprise a clock generator. addressing units are associated to each of the systems. The addressing units each comprise an address counter and are used for addressing while the information is being written in the memory locations of the buffer according to a first time base determined by the clock generator of one system. The addressing units are also for addressing while the information is being read out according to a second time base determined by the clock generator of the other system. The second time base substantially corresponds to the first time base.

The invention further relates to a data communication system comprising two or more digital systems which exchange information through a buffer connected to the systems.

2. Related Art

Such a buffer is known from French Patent Application FR 2 583 238 and is used, for example, in digital telephone exchanges or for communication between digital systems, such as microprocessors, modems etc.

The disadvantage of prior-art buffer is that the transmission efficiency expressed in terms of amounts of effectively transmitted information is too low when the buffer is used in a communication system.

SUMMARY OF THE INVENTION

It is an object of the invention to optimize the transmission efficiency when the buffer is used in a communication system.

For this purpose, the buffer according to the invention is characterized in that the buffer comprises two rows of cyclically numbered memory locations and the buffer includes a control circuit coupled to the addressing units. The control circuit is arranged in such a manner that, during the addressing operation, either system writes information in a memory location in one row and reads information from the corresponding memory location in the other row, whereas the other system reads the information from the memory location in one row and writes the information in the corresponding memory location in the other row.

If each of the two systems reads and writes substantially simultaneously during the addressing operation of the thus arranged dual buffer, the transmission efficiency is further improved. Communication between the digital systems may then be effected in the full duplex mode.

Data communication between systems each comprising their own clock generator poses specific requirements in the control logic, however, because there is usually frequency or phase inequality between the clock signal of the transmitting system and that of the receiving system. In certain circumstances the frequencies may deviate to such an extent that the address counts (pointers) on the basis of which the addressing is performed when information is written or read out, become equal, which would cause information at a specific memory location to be written and read out simultaneously. In that case the transmitted information is mutilated, which is usually designated bit slip. If this situation is detected by the address distance monitoring means, the address counts also designated pointers are set apart, that is to say, rendered different relative to each other, which necessitates a renewed transmission of information transmitted previously.

In an embodiment for the buffer this buffer comprises an address distance monitoring means connected to the addressing units for creating a difference between the address counts (pointers) of the address counters when equality between the address counts (pointers) of the address counters is detected, which address distance monitoring means is arranged in such a way that the distance between the pointers of the address counters is made equal to n/2.

A pointer difference of n/2 maximizes the mutual distance between the pointers controlled by the relevant clock generators, so that the chance of the pointers addressing the same memory location at any one moment is minimized. This minimizes the number of necessary retransmissions in which the same information is to be retransmitted for obtaining a reliable information transmission and optimizes the transmission efficiency. In this manner the control protocols with which a retransmission of bit, byte or frame-structured information is provided with the aid of check bits and control bits are thus resorted to for shorter time intervals. The gain of time leads to a further improvement of the amount of effectively transmitted information.

By influencing, according to a further embodiment of the buffer, the pointers of the address counters in such a way that one of the pointers is brought back to a fixed initial position in the buffer after the address distance monitoring means has detected equality, a simplified retransmission is effected in the cases where the byte synchronisation is lost during information transmission between the digital systems.

BRIEF DESCRIPTION OF THE DRAWINGS

The invention will also be further explained with reference to the annexed drawing. In the drawing the FIGURE shows a preferred embodiment of a communication system and a buffer according to the invention.

DESCRIPTION OF THE PREFERRED EMBODIMENTS

The drawing FIGURE shows a communication system 1 comprising two digital systems 2 and 3 coupled through a buffer 4. The systems 2 and 3 are connected to the respective lines 5 and 6 and connected to the storage area 7 of the buffer 4. Data communication between the systems 2 and 3 is effected in that, for example, information originating from system 2 is written in the storage area 7 and after being read out is made available to a system 3 over line 6. Self-evidently, the reverse is also possible, in which case system 3 transmits the data to system 2. In a specific embodiment to be described hereinafter, the writing and reading of information in the memory area 7 may even be performed simultaneously by the two systems 2 and 3.

The communication between the two systems 2 and 3 is effected in synchronism, which is to say, communication is effected under the control of a clock signal. This clock signal is generated by clock generators 8 and 9 included in each of the systems 2 and 3. The clock generators 8 and 9 produce the time base signals in response to which synchronous data communication takes place. This communication does not take place, however, in the manner in which either time base dominates the other. Each of the systems 2 and 3 retains its autonomous time base derived from the relevant output signal of the clock generator 8 or 9 to address the storage area 7.

The storage area 7 comprises, for example, one or two rows of memory locations a1 to an and b1 to bn respectively. First the case will be described where the buffer 4 comprises a single row of memory locations a1 to an. The drawing Figure diagrammatically shows the case where n=8.

Addressing units 10 and 11 shown in the buffer 4 comprise address counters 12 and 13 in which address values are stored in the form of pointers for addressing the memory locations. Over the lines 5 and 6 the systems 2 and 3 provide information in the form of check and control signals influencing the pointers of the address counters 12 and 13 in the buffer 4. Furthermore, a clock signal is generated by each of the clock generators 8 and 9 and added to the information to be transmitted, from which the pointers can be derived. This clock signal may be transmitted by the systems 2 and 3 over a separate line in tandem with the information data portion to be transmitted, but, alternatively, it is possible that the clock information is included in the coding of the data to be transmitted.

In the latter case the clock information can be recovered by regenerating the transmitted data.

Assuming that system 2 wishes to transmit data to system 3, the actual data transmission will be effected bit-by-bit, generally under the control of a suitable protocol. The information transmitted bit-by-bit over line 5 is written in a memory location, for example, a7, for which case the value of 7 will be stored in the address counter 12. The buffer 4 is a cyclic memory and structured as a ring memory. Once the information has been written in memory location a7, the address counter 12 is incremented in response to the clock signal received from system 2, after which memory location a8 is filled with information conveyed over line 5. This process will be continued while, for example, memory location a3 can be read out simultaneously. In that case the address counter 13 stores the value of 3. When the information at memory location a3 is read out, the information is made available to line 6 and is thus received by system 3. In this fashion the information previously written in memory location a3 by the system 2 is received in system 3 after some time. On the other hand, if system 3 wishes to transmit information to system 2, the operation of the system is similar, with the addressing of the relevant memory location of the transmitting system 3 being effected by means of the pointers stored in the address counter 13 and the addressing of the memory location of system 2 is effected by means of the pointers of address counter 12. As long as reading and writing operations are performed with the aid of pointers at places which do not overlap, the information transmission will be unaffected. However, in the case of frequency oscillations, for example, occurring as a result of temperature variations or the like, there will be differences between the read and write speeds and the mutual speeds with which the pointers are changed will no longer be substantially equal. In that case it may happen that information is written in a memory location and that from the same location information should be read out. This situation is monitored by means of an address distance monitoring means 14 connected to the addressing units 10 and 11. The moment equality between the pointers of the address counters 12 and 13 is detected by this monitoring means, the pointers are influenced so that a difference between them is created. For the detailed explanation of the operation and arrangement of above-described system 1 reference be made to European Patent Application 0 161 034 and its U.S. counterpart, U.S. Pat. No. 4,755,971, which is incorporated by reference in this application.

If the memory location at which the collision between the writing and reading of information is designated $p_c$, and the number of memory locations of memory area 7 is designated n, the difference between the pointers of the address counters 12 and 13 after equality is detected is to become such that $(p_c \pm n/2) \geq 1$ and $\leq n$, so that a maximum transmission efficiency under prevailing circumstances is obtained, and in which this expression is to become the new pointer of at least one of the two address counters 12, 13. For example, if collision occurs at memory location 6, and n=8, the new pointer becomes equal to 2, so that the pointers end up a maximum distance apart. The chance that in such a case phase deviations between the clock signals of the clock generators 8 and 9 will lead to a collision is then minimized. This will also minimize the chance of mutilation of transmitted information and the same holds for the necessity of initiating a retransmission of previously transmitted, but mutilated information after collision. It will be evident that such a retransmission, controlled by a suitable control protocol for which retransmission check and control signals are to be transmitted and for which also previously transmitted information is to be retransmitted, adversely affects the transmission efficiency.

When collision is detected in practice, the pointers of the address counters 12 and 13 are adjusted to 0 and n/2, respectively.

In a second embodiment the storage area 7 of the buffer 4 comprises two aforedescribed rows a and b having cyclically numbered memory locations a1 to an and b1 to bn. In one row, for example row a, information of, for example, system 2 is written in, for example, memory location a7, while information is read out from the corresponding location b7. In that case memory location 3 will be addressed by addressing unit 11 comprising address counter 13, while information is read out from memory location a3 and a few instants later information originating from system 3 is written in memory location b3. In this fashion the transmission capacity of the buffer 3 is doubled. The control logic necessary for this purpose is accommodated in a control circuit 15 connected to the two addressing units 10 and 11. In view of the control logic arrangement described in aforementioned European Patent Application 0 161 034 and its U.S. counterpart, U.S. Pat. No. 4,755,971, which logic is necessary for information transmission by means of single-row memory locations, the arrangement of the control circuit 15 which includes the logic necessary for controlling the second row of memory locations present is deemed to be known to the expert.

If the pointers of the address counters 12 and 13 are changed in such a way that one of them is reset to a fixed initial position, for example, 1 in the present case once they have been differentiated after collision, it will be possible to restore the byte synchronisation in a simpler manner if the byte synchronisation in the data control protocol has been lost, because the restoration of lost byte synchronisation necessitates bringing back the relevant read and write pointers to fixed initial positions.

| LEGEND: | |
| --- | --- |
| data communication system | 1 |
| digital systems | 2, 3 |
| buffer | 4 |
| lines | 5, 6 |
| storage area | 7 |
| clock generators | 8, 9 |
| addressing units | 10, 11 |
| address counters | 12, 13 |
| address distance monitoring means | 14 |
| contol circuit | 15 |

We claim:

1. Buffer for temporary storage of digital information which is transmitted between first and second digital systems, which systems are coupled to each other through the buffer, and which systems each comprise a respective clock generator, the buffer comprising first and second rows of n successive memory locations, the locations of each row being cyclically addressable, where n is a number greater than one, first and second addressing unit, each associated with a respective one of the systems, each addressing unit comprising a respective address counter, which addressing units are for addressing the memory locations, each addressing unit controlling access to the memory locations according to a respective time base determined by the respective clock generator of the respective one of the systems, the respective time bases being substantially the same, and a control circuit, coupled to the addressing units, for controlling the addressing units so that the first system writes information in a memory location in the first row and reads information from the corresponding memory location in the second row and the second system reads the information from the memory location in the first row and writes the information in the corresponding memory location in the second row.

2. The buffer of claim 1 further comprising monitoring means for monitoring a difference between address counts of the address counters and creating a difference of n/2 between the address counts in response to the monitoring means detecting equality between the address counts.

3. The buffer of claim 2 wherein one of the address counters is set to a fixed initial count upon the monitoring means detecting equality between the address counts.

4. A data communication system comprising:
 a) a buffer for temporary storage of digital information,
 b) first and second digital systems each comprising a respective clock generator and each connected to the buffer and coupled to each other for transmission of digital information through the buffer,
 c) the buffer comprising:
  (i) first and second rows of n successive memory locations, the locations of each row being cyclically addressable, where n is a number greater than one,
  (ii) first and second addressing units, each associated with a respective one of the systems, each addressing unit comprising a respective address counter, which addressing units are for addressing the memory locations, each addressing unit controlling access to the memory locations according to a respective time base determined by the respective clock generator of the respective one of the systems, the respective time bases being substantially the same,
  (iii) a control circuit, coupled to the addressing units, for controlling the addressing units such that the first system writes information in a memory location in the first row and reads information from the corresponding memory location in the second row and the second system reads the information from the memory location in the first row and writes the information in the corresponding memory location in the second row.

5. The communication system of claim 4, further comprising monitoring means for monitoring a difference between address counts of the address counters and creating a difference of n/2 between the address counts in response to the monitoring means detecting equality between the address counts.

6. The communication system of claim 5, wherein one of the address counters is set to a fixed initial count upon the monitoring means detecting equality between the address counts.

* * * * *